Aug. 14, 1945.   R. D. SALMON   2,382,668
SHOCK-ABSORBING MEANS ESPECIALLY SUITABLE FOR
USE WITH TYPEWHEELS IN PRINTING APPARATUS
Filed Jan. 12, 1944   3 Sheets-Sheet 2

Inventor
Reginald Dennis Salmon
By
Attorney

Aug. 14, 1945.   R. D. SALMON   2,382,668
SHOCK-ABSORBING MEANS ESPECIALLY SUITABLE FOR
USE WITH TYPEWHEELS IN PRINTING APPARATUS
Filed Jan. 12, 1944   3 Sheets-Sheet 3
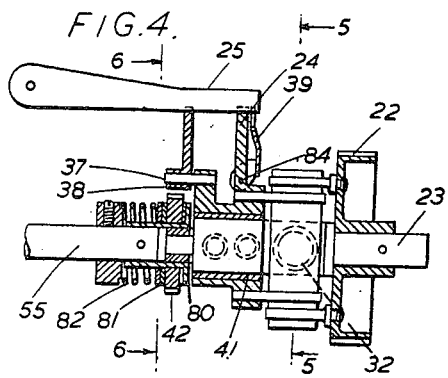
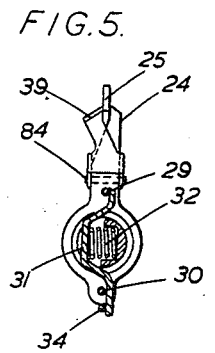
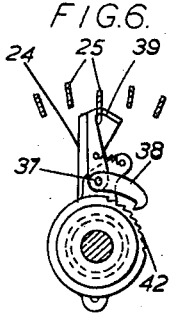
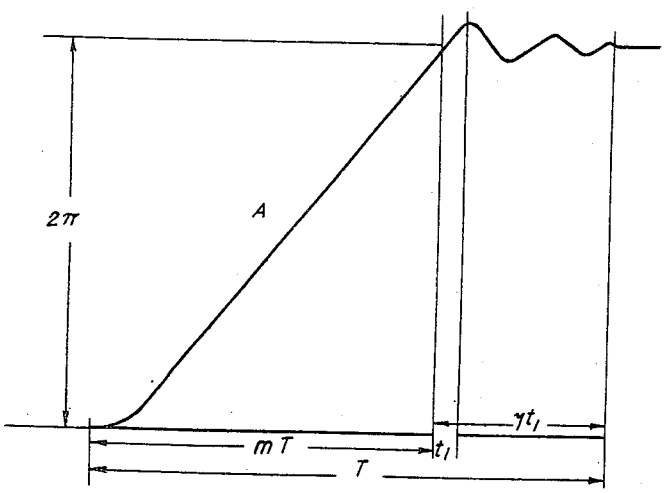
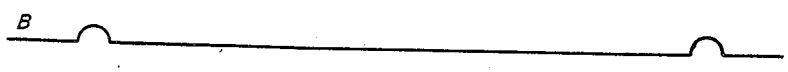
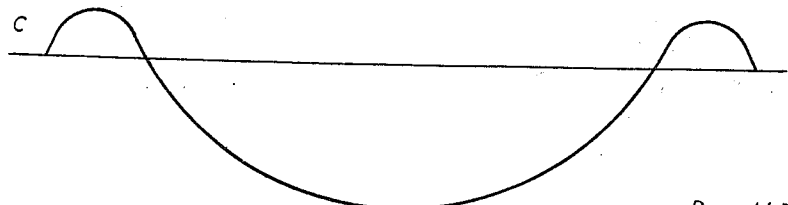
Inventor
Reginald Dennis Salmon
By
Robert Harding
Attorney Patented Aug. 14, 1945

2,382,668

UNITED STATES PATENT OFFICE 2,382,668

SHOCK-ABSORBING MEANS ESPECIALLY SUITABLE FOR USE WITH TYPE WHEELS IN PRINTING APPARATUS

Reginald Dennis Salmon, Croydon, England, assignor to Creed and Company Limited, Croydon, Surrey, England, a British company Application January 12, 1944, Serial No. 517,910
In Great Britain January 29, 1943

16 Claims. (Cl. 197—44)

This invention relates to printing telegraph apparatus comprising a typewheel, a clutch for driving the typewheel from a continuously rotating shaft, a stop arm driven from said clutch, a plurality of stops, means for selectably positioning any one of said stops in the path of said stop arm and latch means for preventing rebound of said stop arm from said stop.

Apparatus of this kind is well known and is shown, for example, in British Specification 350,044.

It is the main object of the present invention to provide means for reducing wear and noise consequent upon the shock of stopping the typewheel.

According to the present invention we provide in apparatus of the above kind, a resilient connection between the stop arm and the typewheel and damping means for dissipating the energy of the typewheel.

It will be understood that when the stop arm encounters a stop and is brought to rest, the typewheel will continue its motion and overshoot the required position, but that the damping means will bring it to rest after a very few oscillations about the required position.

It will be clear that the stop arm may be mounted so that there is a resilient connection between said arm and the typewheel spindle, or the resilient connection may be between the stop arm and a gear through which the typewheel spindle is driven. The stop arm may, for example, be connected rigidly to a first gear wheel which drives the typewheel spindle through an intermediate gear. In such case the damping means may be applied to the intermediate gear, and the latter may be carried by a framework mounted to move in a plane normal to the plane passing through its axis and that of the gear wheel connected to the stop arm. In this embodiment, the framework is restrained from movement by springs under compression and the endways movement of the framework is damped either by friction damping or by an oil dash pot.

It is, however, found preferable to make the parts rigidly connected to the stop arm of as small inertia as possible and to have the main moment of inertia in the parts resiliently connected thereto. Friction damping has been found preferable to oil damping and the preferred form of friction damping consists of self-lubricating surfaces in the form of internal bearings.

The invention is applicable either to tape printers or to page printers. In page printers there is considerable advantage to be gained in mounting the paper platen in a stationary framework and in traversing the type carriage with respect thereto. It is obvious that if the printing means is a typewheel, the type carriage will be much lighter than if a type basket with type bars is to be mounted thereon, but many problems arise in the use of a typewheel in a moving carriage page printer. If the typewheel is to be selectably stopped by means of a stop arm driven through a clutch from a continuously rotating shaft, the moving parts to be stopped must have very considerable moment of inertia. The present invention is therefore of great importance as applied to a page printer and a feature of the invention is printing telegraph apparatus comprising a carriage, a spindle journalled in said carriage, a typewheel fixed to said spindle, a spline shaft, means for driving said spindle from said spline shaft, means for traversing said carriage along said spline shaft, a clutch for driving said spline shaft from a continuously rotating shaft, a stop arm driven through said clutch and resiliently connected to said spline shaft, a plurality of stops, means for selectably positioning any one of said stops in the path of said stop arm, damping means for dissipating the energy of said spline shaft and latch means for preventing the rebound of said stop arm from said stop.

Two embodiments of the invention as applied to a page printer will now be described with reference to the accompanying drawings in which:

Fig. 4 is a longitudinal sectional view of a preferred form of the invention;

Fig. 5 is a section on the line 5—5 of Fig. 4;

Fig. 6 is a section on the line 6—6 of Fig. 4;

Fig. 7 is a curve showing the motion of the typewheel.

Figure 1:
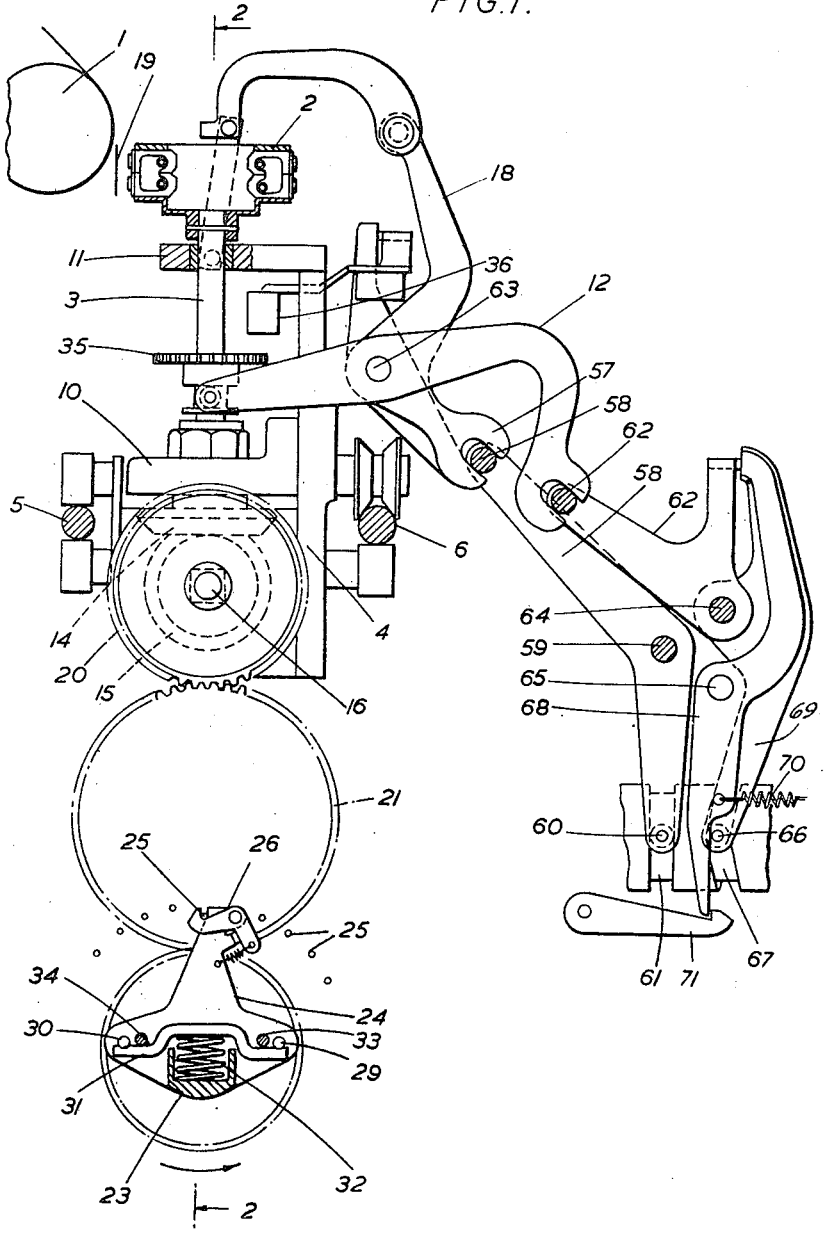
Fig. 1 is a side view, with some of the parts in section, of a type carriage in a page printer, the driving means for the typewheel and printing means and figure and letter shift device.
Figure 2:
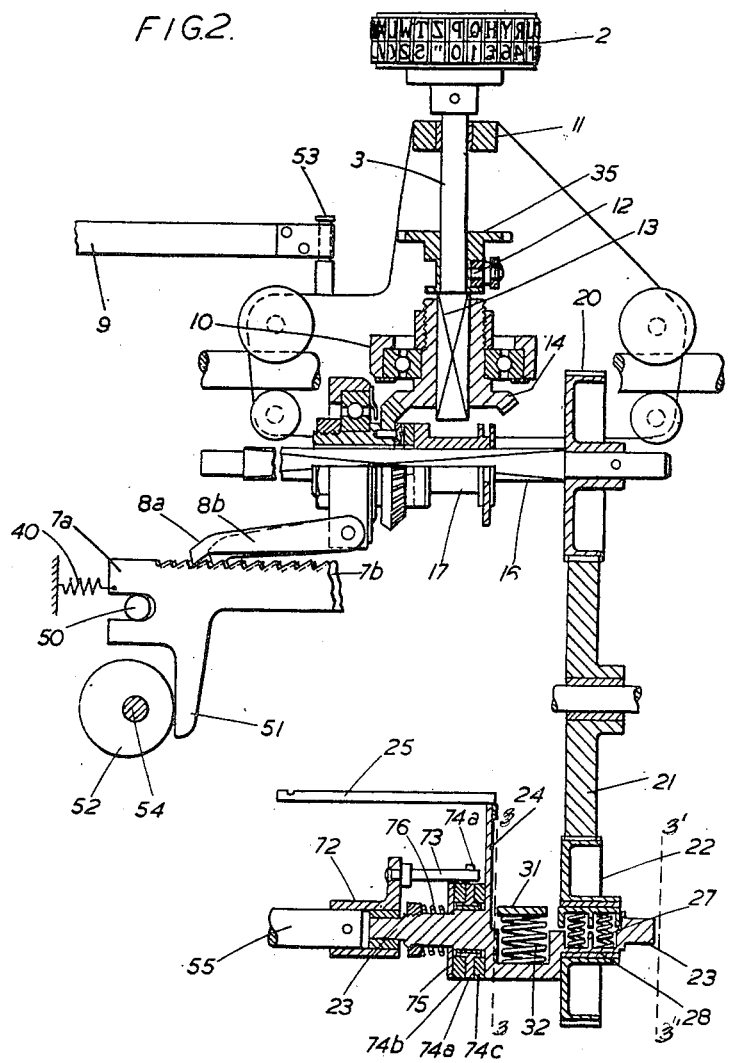
Fig. 2 is a section on the line 2—2 of Fig. 1.
Figure 3:
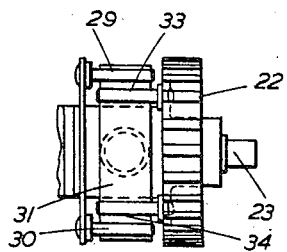
Fig. 3 is a top plan view of the portion of Fig. 2 between the lines 3, 3 and 3', 3'.

Referring first to Figs. 1, 2 and 3, the typewheel 2 is fixed to a vertical spindle 3, mounted in bearings 10, 11 on a carriage 4. The carriage 4 runs on guide rails 5, 6 parallel to the axis of a paper platen 1 rotatably mounted in a fixed framework (not shown). Pivoted to the carriage 4 are two pawls 8a and 8b, Fig. 2, each of which engages a corresponding rack 7a, 7b. Rack 7b is fixed, whilst rack 7a is mounted for longitudinal reciprocation on studs 50, one only of which is shown and is formed with a depending projection 51. Spring 40 holds bar 7a to the left in Fig. 2 and the projection 51 against a cam 52 on a shaft 54.

Spindle 3 is provided at its lower end with a squared portion 13 which can slide within an internally squared sleeve carrying a bevel gear 14. Also carried on the carriage 4 is a sleeve carrying a bevel gear 15 mounted to be freely rotatable about a spline shaft 16. The gear 15 is driven from the spline shaft 16 by means of a splined sleeve 17 sliding along the shaft 16 and rotating with it. Sleece 17 engages with gear wheel 15 by means of a self aligning coupling.

The carriage 4 is traversed by means of the cam 52 which is rotated after the printing of each character to reciprocate bar 7a, and thus by means of pawls 7a and 7b moves the carriage 4 one step to the right in Fig. 2 against the tension of a tape 9 fixed to a pin 53 on the carriage and to a spring reel (not shown) on the framework of the apparatus.

A motor driven shaft 55 drives through a clutch hereinafter described as shaft 23 on which is a gear wheel 22. Gear wheel 22 meshes with an idler gear 21, which in turn meshes with a gear wheel 20 fixed on the spline shaft 16. Thus shaft 55 drives the typewheel 2 through shaft 23, gear wheels 22, 21 and 20, shaft 16, sleeve 17, bevel gears 15 and 14 and spindle 3.

Fixed to shaft 55 is a sleeve 72 carrying a pin 73 which engages a washer 74a mounted about shaft 23. Fixed to washer 74a on either side thereof are washers 74b and 74c. Washers 74a, 74b and 74c are self lubricating washers. Keyed to shaft 23 is a disc 75 which is pressed against washer 74b by a spring 76. The arrangement constitutes a friction clutch by means of which shaft 23 is driven from shaft 55. This form of clutch is well known, but the clutch shown is arranged somewhat differently from the usual arrangement in order to reduce the mass of the driven portion, that is to be started and stopped, to a minimum. Fixed to shaft 23 is a stop arm 24. A series of stops 25, Fig. 1 is arranged concentrically of shaft 23 and means is provided for selecting one of these stops to be brought into the path of the stop arm 24. This selecting means may be that described in British Specification 350,044 or that described in Specification No. 17,725. One of these stops 25 is shown in selected position in Fig. 1.

Between the stop arm 24 and the gear wheel 22 is a resilient connection. This comprises a spring 32 fitted into a radial hole in shaft 23 and held under stress by a transverse member 31. The transverse member is pressed down by two pairs of pins, each pin being parallel to the axis of shaft 23. Pins 29, 30 on opposite sides of the axis of shaft 23 are fixed to stop arm 24, and pins 33, 34 also on opposite sides of the axis of shaft 23 are fixed to the gear wheel 22.

Gear wheel 22 is connected to shaft 23 by means of an arrangement which comprises an internal bearing for the wheel 22 constituting a rotary frictional damping means. The portion of the shaft 23 upon which the gear wheel 22 is mounted is split in a plane passing through the axis and the two parts are urged outwards by springs 27 so that frictional pressure is exerted upon the inside of the gear wheel, which is lined with a self lubricating bearing 28.

Pivoted on the stop arm 24 is a pawl 26, spring pressed in a clockwise direction as shown in Fig. 1. The stop arm 24 rotates counterclockwise as viewed in Fig. 1 so that when the stop arm 24 comes against a stop 25 the pawl 26 springs past the stop, engages it and prevents backward movement of the stop arm.

When the stop arm is suddenly arrested, the gear wheel 22 (and therefore the typewheel 2) is permitted to continue its rotation, since it is not rigidly connected to shaft 23, and thus compresses the shock absorber spring 32. The energy in the type wheel system is partly absorbed by the shock absorber spring 32 and the energy thus stored in the spring will cause the gear wheel 22 to rotate in the opposite direction and overshoot its normal position. The movement of the typewheel from the moment of release to the moment when printing takes place is shown in curve A of Fig. 7. The energy of the typewheel is being dissipated by the damping clutch between shaft 23 and gear wheel 22 and although the type wheel will oscillate a little it will be rapidly brought to rest. It has been found that, by adjusting the clutch 27, 28 and shock absorber spring 32 so that the torque exerted on the gear wheel 22 by the spring 32 is not more than twice the torque exerted on the gear wheel 22 by the damping clutch 27, 28 then spring 32 exerts substantially constant torque on gear wheel 22 during the overshooting. In these conditions, if $t_1$ be the time required for the first quarter cycle overshoot as shown in curve A of Fig. 7, then the amplitude of oscillation will be reduced to zero dimensions in a time not greater than $7t_1$.

Immediately after the typewheel has been brought to rest a corrector tooth 36, Fig. 1, is brought into engagement with a corrector wheel 35 on the type wheel spindle 3 in order to correct for any backlash between the gear wheel 22 and the type wheel spindle 3. Immediately afterwards a printing cam operates to carry out printing in a manner described hereinafter. The action of the printing cam is shown in curve B of Fig. 7.

It is clear that the time allowed for the rotation of the typewheel and for bringing it to rest must be sufficient to allow of the typewheel making a complete rotation before the stop arm 24 contacts with one of the stops 25 and this condition is shown in curve A of Fig. 7, the time T denoting that required for a rotation of $2\pi$ and for bringing the typewheel to rest. It has been found that there is an optimum ratio between the two parts of the motion and if it be assumed that, for a rotation of $2\pi$, the typewheel is arrested after a time which is a fraction $mT$ of the time T for a full cycle, the optimum value of $m$ is between 0.65 and 0.75.

The type wheel 2 is of the kind described in Specification No. 2,180,360, and has two rows of type pallets having character faces arranged around the periphery of the type wheel. The type pallets are held in the type wheel structure by springs and are arranged to be driven radially of the type wheel by a print hammer. The type wheel is raised up into printing position, the selected type bar is driven radially of the type wheel and strikes an ink ribbon 19 against the paper on the platen 1. The type wheel is then lowered from printing position so that the character just printed is visible. Such an arrangement is described in Specification No. 2,180,360, but in that case the type carriage was fixed and the platen movable so that the arrangements for raising and lowering the type wheel and for printing in the apparatus shown in Figs. 1, 2 and 3 differs therefrom and will now be described.

The raising and lowering of the type wheel spindle 3 is effected by means of a lever 12, Fig.

1, pivoted at 63 in the carriage 4 and formed with a fork embracing a bail 62 pivoted at 64 in the framework of the apparatus and extending parallel to the spline shaft 16 across the whole width of the platen 1. The bail 62 is rotatable around its pivots 64 by means of a pair of levers 65, 68, the lever 65 being pivoted on the same pivot 64 as the bail 62 and the other lever 68 being pivoted at 69. The lever 68 is held against a pin 66, which also carries a cam roller, by means of a spring 70. A cam 67 acts on the cam roller and either through lever 65 alone or through levers 65 and 68 operates the bail 62 which in turn rotates the lever 12 to raise the type wheel spindle. The contour of the cam 67 is as shown on an enlarged scale in curve C of Fig. 7 and is there shown in proper relation to the printing cam shown in curve B. The motion imparted by cam 67 is simple harmonic motion.

The typewheel 2 carries two rows of type and the height to which the typewheel is raised depends upon the letter shift or figure shift signals received. When a letter shift signal is received a lever 71 is positioned as shown in Fig. 1 and a tooth thereon engages a tooth on lever 68. When lever 71 is positioned by a figure shift signal it is moved to clear the tooth on lever 68. The position of lever 71 is selected by the position of the combination discs controlling the selection of a stop 25.

In letter shift position of lever 71, movement of lever 68 is prevented, and when cam 67 acts to move lever 65 anti-clockwise, the lever pivots about 64 to move bail 62 an amount sufficient raise the upper row of type into printing position. In the figure shift position of lever 71, lever 68 is left free to follow the movement of cam lever 65 so that it rotates in an anti-clockwise direction around pivot 69 and because of the difference in the lever ratio it imparts a greater movement to bail 62 sufficient to raise the lower row of type into printing position.

When the type wheel spindle has been raised up into printing position, printing cam 61 acts on its cam follower 60 to give a sudden clockwise rotation to a bail 58. Bail 58 extends parallel to the platen 1 and is pivoted at 59 at each end. A printing lever 18 is pivoted on carriage 4 at 63 and is provided with a fork 57 which slides along the bail 58. When therefore bail 58 is moved clockwise, printing lever 18 is moved anti-clockwise about its pivot and strikes the type against an ink ribbon 19 and against the platen 1.

Figs. 4, 5 and 6 show a preferred form of driving arrangement for the typewheel system using a frictionally driven ratchet clutch in which the moment of inertia of the parts to be stopped suddenly has been reduced to a minimum.

The continuously driven shaft 55 drives a ratchet wheel 42 through a friction clutch. The ratchet wheel 42 is compressed between the flange 86 of a sleeve fixed to shaft 55 and a friction disc 81 slidably mounted on the shaft, by means of a spring 82. The shaft 23 is mounted in alignment with shaft 55 and a sleeve 41 lined with a self lubricating lining 46 is mounted about this shaft. The portion of the shaft 23 within the sleeve 41 is split in a plane passing through the axis and the two parts are pressed apart by springs, thus constituting a frictionally damped bearing similar to that shown in Fig. 2. The sleeve 41 carries a stop arm 24 and a pin 37. Mounted on the pin 37 is a pawl 38 spring pressed to engage the ratchet wheel 42.

The stops 25 are arranged concentrically of the shafts 55 and 23 and are of the kind described in Specification 228,842 and are selectively positioned in the path of the stop arm 24 in the manner described in that specification. Added to the stop arm 24 and pivoted thereto at 84 is a latch 39 which engages on the opposite side of a stop 25 and prevents the stop arm from rebounding. The pawl 38 is furnished with an arm extending into the path of a selected stop 25 in such manner that when the stop arm 24 engages such stop 25 the upright arm of the pawl 38 engages the same stop and the pawl is disengaged from the ratchet 42.

In this modification the gear wheel 22 is fixed to the shaft 23 and the shaft 23 is driven from sleeve 41 by a resilient coupling which is of the same form as the resilient coupling shown in Figs. 1 to 3. A spring 32 is compressed in a hole in shaft 23 by a transverse member 31 which holds the spring in compression by the engagement with the member 31 of pins 29, 30 fixed to sleeve 41 and pins 33, 34 fixed to gear wheel 22.

What is claimed is:

1. Printing telegraph apparatus including a continuously rotating shaft, a typewheel, a clutch for intermittently driving said typewheel from said continuously rotating shaft, a stop arm driven through said clutch, a plurality of stops, means for selectively positioning a predetermined one of said stops in the path of said stop arm, a resilient connection between stop arm and typewheel for accumulating the energy of the typewheel when stopping occurs and returning thereto at least a portion of said energy, damping means for dissipating the returned energy of said typewheel, and latch means for preventing rebound of said stop arm from said predetermined stop.

2. Printing telegraph apparatus including a continuously rotating shaft, a carriage, a spindle journalled in said carriage, a typewheel fixed to said spindle, a spline shaft, means for driving said spindle from said spline shaft, means for traversing said carriage along said spline shaft, a clutch for intermittently driving said spline shaft from said continuously rotating shaft, a stop arm driven through said clutch, a plurality of stops, means for selectably positioning a predetermined one of said stops in the path of said stop arm, a resilient connection between stop arm and spline shaft for accumulating the energy of the spline shaft when stopped and returning thereto at least part of said energy, damping means for dissipating the returned energy, and latch means for preventing the rebound of said stop arm from said predetermined stop.

3. Apparatus according to claim 1, in which the means for providing said resilient connection comprises a spring which is held under stress when said stop arm and said typewheel are both stationary.

4. Apparatus according to claim 2, in which the means for providing said resilient connection comprises a spring which is held under stress when said stop arm and said typewheel are both stationary.

5. Apparatus according to claim 1, wherein said resilient connection includes a spindle driving said typewheel, a transverse member, and a spring located diametrically of said spindle, two pins holding said transverse member against said spring, located on opposite sides of the axis of said spindle and connected to said stop arm, and two other pins also on opposite sides of the axis of said spindle and connected to said typewheel, all four pins bearing against said transverse member and imparting a return movement to said typewheel, said damping means being effective during said return movement.

6. Apparatus according to claim 1, in which said damping means comprises frictional damping means.

7. Apparatus according to claim 1, in which said damping means comprises self-lubricating surfaces spring-pressed together so as to afford frictional damping.

8. Apparatus according to claim 2, wherein said stop arm and parts rigidly connected thereto are chosen so as to have small moment of inertia compared with the parts resiliently connected thereto, the main moment of inertia of the moving parts being in said latter parts.

9. Apparatus according to claim 1, comprising means for frictionally driving said clutch, said clutch being of the ratchet type and being adjusted so that the torque thereof is of the order of the total torque exerted by the damping means.

10. Apparatus according to claim 1, in which the angular velocity given to the typewheel is so chosen that the time required for a complete rotation thereof is between 0.65 and 0.75 of the total time between the start of the typewheel from rest and the reduction of its movement to zero amplitude after stopping.

11. Apparatus according to claim 2, and also including means for raising said typewheel and additional means for lowering said typewheel so that the last character printed is visible.

12. Apparatus according to claim 2, and also including means for raising said typewheel and additional means for lowering said typewheel so that the last character printed is visible, said typewheel being provided with two rows of type pallets having character faces arranged around the periphery of the typewheel and hammer means arranged to drive the selected type pallet radially of the typewheel for printing.

13. Apparatus according to claim 2, comprising means for raising said typewheel into printing position during the rotation thereof, said means including a cam and a lever actuated by said cam and means for varying the lever ratio in accordance with a shift signal to cause a predetermined row of type to be placed in printing position.

14. Apparatus according to claim 2, in which said spindle is driven from said spline shaft through a driving element having a frictional surface moving in contact with a corresponding surface of said spline shaft when stopping occurs.

15. Apparatus according to claim 2, in which said spindle is driven from said spline shaft through a driving element having a frictional surface moving in contact with a corresponding surface of said spline shaft when stopping occurs, and in which said surfaces are self-lubricating and spring-pressed together.

16. Apparatus according to claim 2, in which said spindle is driven from said spline shaft through a driving element having a frictional surface moving in contact with a corresponding surface of said spline shaft when stopping occurs, and in which said surfaces are self-lubricating and are spring-pressed together in the form of rotary surfaces forming an internal bearing.

REGINALD DENNIS SALMON.